(12) United States Patent
Tucker

(10) Patent No.: US 8,290,427 B2
(45) Date of Patent: Oct. 16, 2012

(54) SYSTEM AND METHOD FOR PROVIDING WIRELESS SECURITY SURVEILLANCE SERVICES ACCESSIBLE VIA A TELECOMMUNICATIONS DEVICE

(75) Inventor: Curtis Tucker, Lee's Summit, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1126 days.

(21) Appl. No.: 12/174,411

(22) Filed: Jul. 16, 2008

(65) Prior Publication Data

US 2010/0015912 A1 Jan. 21, 2010

(51) Int. Cl.
*H04H 40/00* (2008.01)
(52) U.S. Cl. .... 455/3.06; 455/410; 455/411; 455/404.2; 455/556.1; 725/106; 725/133; 348/143
(58) Field of Classification Search ................. 455/3.03, 455/3.04, 3.06, 41.1, 41.2, 404.1, 404.2, 455/410, 411, 414.1, 414.2, 554.2, 556.1; 725/105, 106, 111, 122, 133; 348/272, 211.99, 348/211.14, 211.1, 211.3, 211.12, 142–155, 348/700–702, 159, 373; 340/500, 530, 539, 340/539.1, 539.11, 539.12, 539.19, 539.13, 340/825.36, 937, 908, 531, 5.53, 825.49; 709/318, 231, 217–219
See application file for complete search history.

(56) References Cited

U.S. PATENT DOCUMENTS

| | | | | |
|---|---|---|---|---|
| 6,271,752 B1 * | 8/2001 | Vaios | | 340/541 |
| 6,989,745 B1 * | 1/2006 | Milinusic et al. | | 340/541 |
| 7,954,129 B2 * | 5/2011 | Renkis | | 725/105 |
| 8,026,804 B2 * | 9/2011 | Wu et al. | | 340/506 |
| 2005/0018766 A1 * | 1/2005 | Iwamura | | 375/240.01 |
| 2005/0132414 A1 * | 6/2005 | Bentley et al. | | 725/105 |
| 2005/0289626 A1 * | 12/2005 | Aboulgasem et al. | | 725/106 |
| 2006/0117371 A1 * | 6/2006 | Margulis | | 725/131 |
| 2006/0155851 A1 * | 7/2006 | Ma et al. | | 709/226 |
| 2007/0173283 A1 | 7/2007 | Livet et al. | | |
| 2008/0103973 A1 * | 5/2008 | Park et al. | | 705/51 |
| 2011/0058034 A1 * | 3/2011 | Grass | | 348/143 |

OTHER PUBLICATIONS

HomeRemote Pro System, Hawking Technology, Inc. http://www.hawkingtech.com/homeremote, Sep. 24, 2008.
Home Control Via Cell Phone, Jun. 5, 2007 by Ben Hardy, http://www.electronichouse.com/article/hawking_homeremote_offers_home_control-via_cell_phone/.
How to Watch Your Children Using your Cell Phone/PDA-Security Camera, Jul. 3, 2007, http://www.spygearco.com/blog/index.php/how-to-watch-your-children-using-your-cell- . . . .
Cell Phone Doubles as Home Surveillance Gear, Oct. 15, 2007 by Lynn Tan, http://news.cnet.com/Cell-phone-doubles-as-home-surveillance-gear/2100-1039-3-6213505.html.
Home Security 2.0, iControl Networks, Inc., http://www.icontrol.com/home_security_2.0/index.php, Sep. 24, 2008.

(Continued)

*Primary Examiner* — Sujatha Sharma
(74) *Attorney, Agent, or Firm* — Swanson & Bratschun, L.L.C.

(57) ABSTRACT

A system and method for providing video surveillance may include providing digital television services to a customer via middleware. The middleware may include digital rights management services. Digital surveillance services may be provided to the customer via the middleware. In providing digital surveillance services to the customer, the customer may be enabled to access surveillance equipment via the middleware from a remote location using a telecommunications device, where the telecommunications device is authorized to access the surveillance equipment by the digital rights management services.

15 Claims, 7 Drawing Sheets

OTHER PUBLICATIONS

High Definition TV to Make its Mark, Sep. 24, 2008, Electronics Engineer Magazine, http://www.engineerlive.com/european-electronics-engineer/20060101/components-and . . . .

Bluetooth Enabled Interaction in a Distributed Camera Surveillance System, P. Rigole, Y. Berbers, T. Holvet, Proceedings of the 37th Hawaii Intl. Conf. on System Sciences, Jan. 4, 2004.

Middleware for Dynamic Reconfigureation in Distributed Camera Systems, Milan Jovanovic and Bernhard Rinner, Jun. 29, 2007.

ViSEC Professional, Visec Surveillance Software for IP and Analog Cameras, http://visecpro.com/key.html, Sep. 24, 2008.

Motorola-funded Device Allows you to View Multiple Cameras from a Cordless or Cell Phone, by Larry Magid http://www.pcanswer.com/articles/security.htm, Sep. 24, 2008.

View Your Security Cameras on Home Server, Nov. 5, 2007, by Philip Churchill, MS Windows Home Server http://mswhs.com/2007/11/05/view-your-security-cameras-on-home-server/.

DRM Security Processes, by Lawrence Harte, IP Television Magazine, http://www.althos.com/IPTVArticles/iptvmagaine_2006_12_DRM.htm.

Adventures with HTPC, May 7, 2007 by Pete Brown, http://community.irritatedvowel.com/blogs/pete_browns_blog/archive/2007/05/07/Adventures-with-HTP . . . .

* cited by examiner

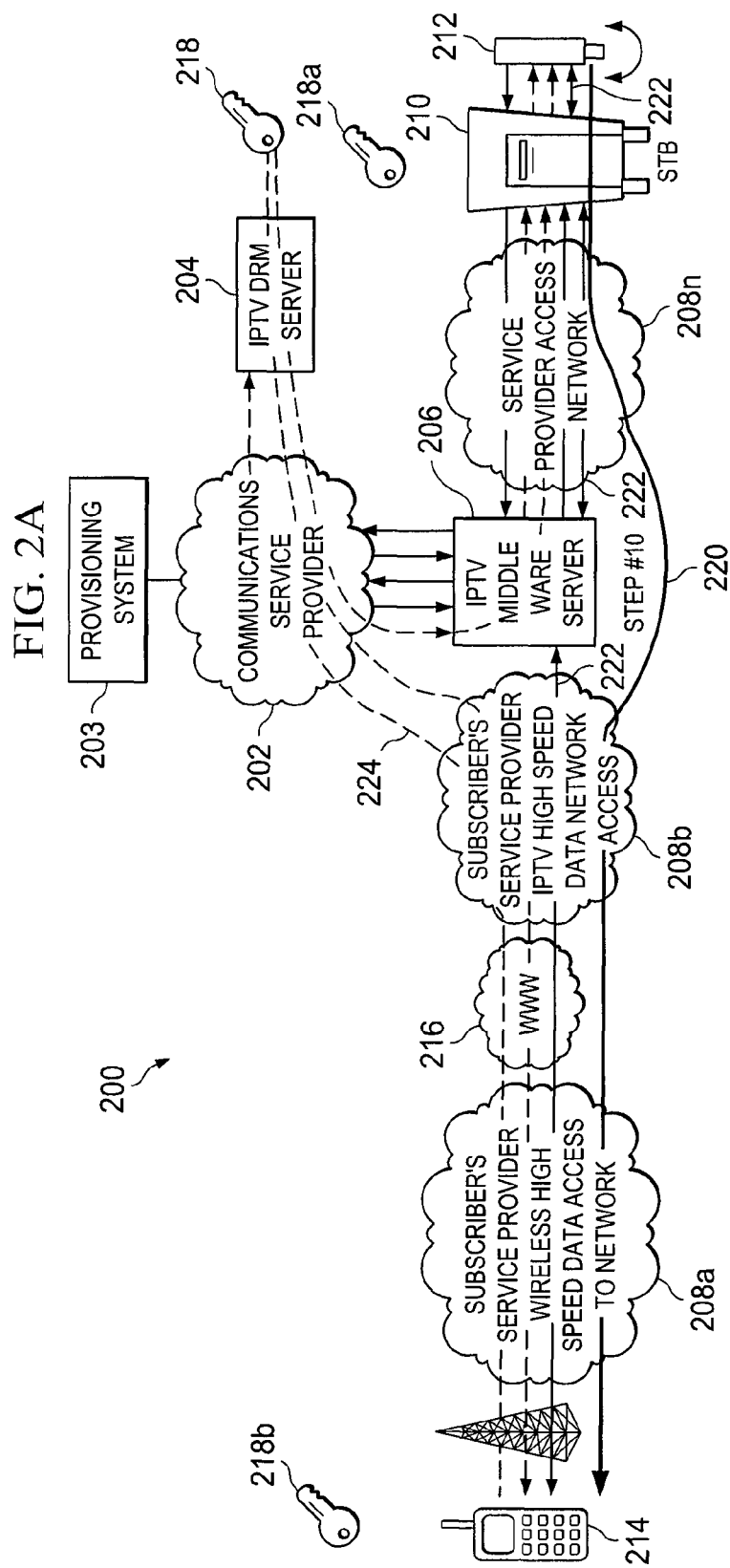

SYSTEM AND METHOD FOR PROVIDING WIRELESS SECURITY SURVEILLANCE SERVICES ACCESSIBLE VIA A TELECOMMUNICATIONS DEVICE

BACKGROUND

Telecommunications, television, and data services have significantly advanced in recent years. Most people have telecommunications devices (e.g., mobile telephones) and routinely carry the telecommunications devices while away from their homes. Television services have also advanced as many people have cable or satellite television in their homes.

The value of goods in people's homes has increased, at least in part, due to individuals owning expensive video and audio equipment. It is not uncommon for people to have several thousands of dollars of electronics equipment in their homes these days.

To protect the valuable electronics equipment and other valuable goods (e.g., jewelry), that people own, people have and continue to protect their homes with security systems. One aspect of home security systems is an alarm that sounds when an intruder triggers the security system by a sensor sensing an unauthorized opening of a door or window. Some home security systems include motion sensors, as well. More advanced security systems include video surveillance. Video surveillance has been used over the years by homeowners to locally record the outside and/or inside of the house. More recently, home video surveillance has been used to stream video over the Internet to allow the homeowner to view the premises of his or her home. A problem that exists with the Internet video streaming solution is the ability for other people to access the unsecured streaming video. Various proprietary video surveillance solutions are available for homeowners to remotely access home video surveillance cameras, but these proprietary systems are limited due to being complicated to configure and due to being expensive because of being customized and having low sales volume.

SUMMARY

To overcome the problems of home video surveillance being limited to proprietary solutions, being expensive, and being complicated, the principles of the present invention provide for a home video surveillance system integrated with existing television delivery systems (e.g., Internet Protocol television (IPTV)) that provides for remote access via a telecommunications device, such as a mobile telephone. By integrating video surveillance into existing television delivery systems, communications service providers who currently deliver television, telephone, and Internet data services, generally known as a "triple play," can add video surveillance services by incorporating the video surveillance services into existing middleware operating on a network, such as the Internet. By using a middleware solution, digital rights management (DRM) may be used, thereby protecting video surveillance data signals from unauthorized users. Furthermore, because the video surveillance services are provided by a communications service provider that already delivers communications services (e.g., triple play communications services) to a home, the cost of adding the video surveillance service is relatively low as compared to other solutions as sales volume to existing and new customers can be relatively high.

One embodiment of a method for providing surveillance services to a customer may include providing digital television services to the customer via middleware. In one embodiment, the middleware includes digital rights management services. Digital surveillance services may be provided to the customer via the middleware. In providing digital surveillance services to the customer, the customer may be enabled to access surveillance equipment via the middleware from a remote location using a telecommunications device. The telecommunications device may be authorized to access the surveillance equipment by the digital rights management services. In authorizing the telecommunications device to access the surveillance equipment, a digital rights management key assigned to the telecommunications device may be compared to a digital rights management key assigned to television equipment, such as a set-top box, or surveillance equipment. Additionally or alternatively, authorization of the telecommunications device may be performed by comparing a network address, telephone number, or other identifier associated with the telecommunications device with information stored in a database, such as a provisioning database managed by a communications service provider. In one embodiment, the customer may control the surveillance equipment via the telecommunications device. The customer may be billed for the digital television service and digital surveillance services on a single bill.

One embodiment of a system for providing surveillance services may include middleware in communications with a communications network. The middleware may be configured to provide communications services to customers of a communications service provider. A digital rights management server may be in communications with the middleware, where the digital rights management server may be configured to authorize access to digital content. A set-top box may be configured to communicate with the middleware to provide digital television services to a customer of a communications service provider. Digital surveillance equipment may be configured to communicate with said set-top box to provide surveillance signals to the customer. A digital rights management database may in communication with the digital rights management server, where the digital rights management server may be configured to (i) receive an identifier of a telecommunications device of the customer, the telecommunications device being remotely located from premises of the customer at which the digital surveillance equipment is located, and (ii) determine whether the telecommunications device has access rights to the surveillance signals. The middleware may further be configured to communicate with the set-top box and the digital rights management server and, if the telecommunications device has access rights to the surveillance signals as determined by the digital rights management server, enable the telecommunications device to communicate with the set-top box.

Another method for providing video surveillance services may include receiving a network address of digital television equipment of a customer of a communications service provider. The network address of the digital television equipment may be validated. A private network address may be communicated to the digital television equipment. The network address and private network address may be communicated to a provisioning system of a communications service provider to be associated with a customer record of the communications service provider, where the communications service provider may provide at least one communications service to the customer other than video surveillance services. A first digital rights management key may be communicated to the television equipment. A second digital rights management key may be communicated with the telecommunications device. The telecommunications device may be authenticated in response to a request to access a video surveillance signal generated by video surveillance equipment in communication with the digital television equipment. In response to the telecommunications equipment being authenticated, the digital television equipment may be instructed to encode the video surveillance signal generated by the video surveillance equipment. A communications link may be established between the telecommunications equipment and television equipment to enable the customer to view the encoded video surveillance signal.

BRIEF DESCRIPTION OF THE DRAWINGS

Illustrative embodiments of the present invention are described in detail below with reference to the attached drawing figures, which are incorporated by reference herein and wherein:

FIG. 2A is an illustration of an illustrative network environment illustrating communications for a customer to remotely access surveillance equipment via a telecommunications device;

DETAILED DESCRIPTION OF THE DRAWINGS

Figure 1:
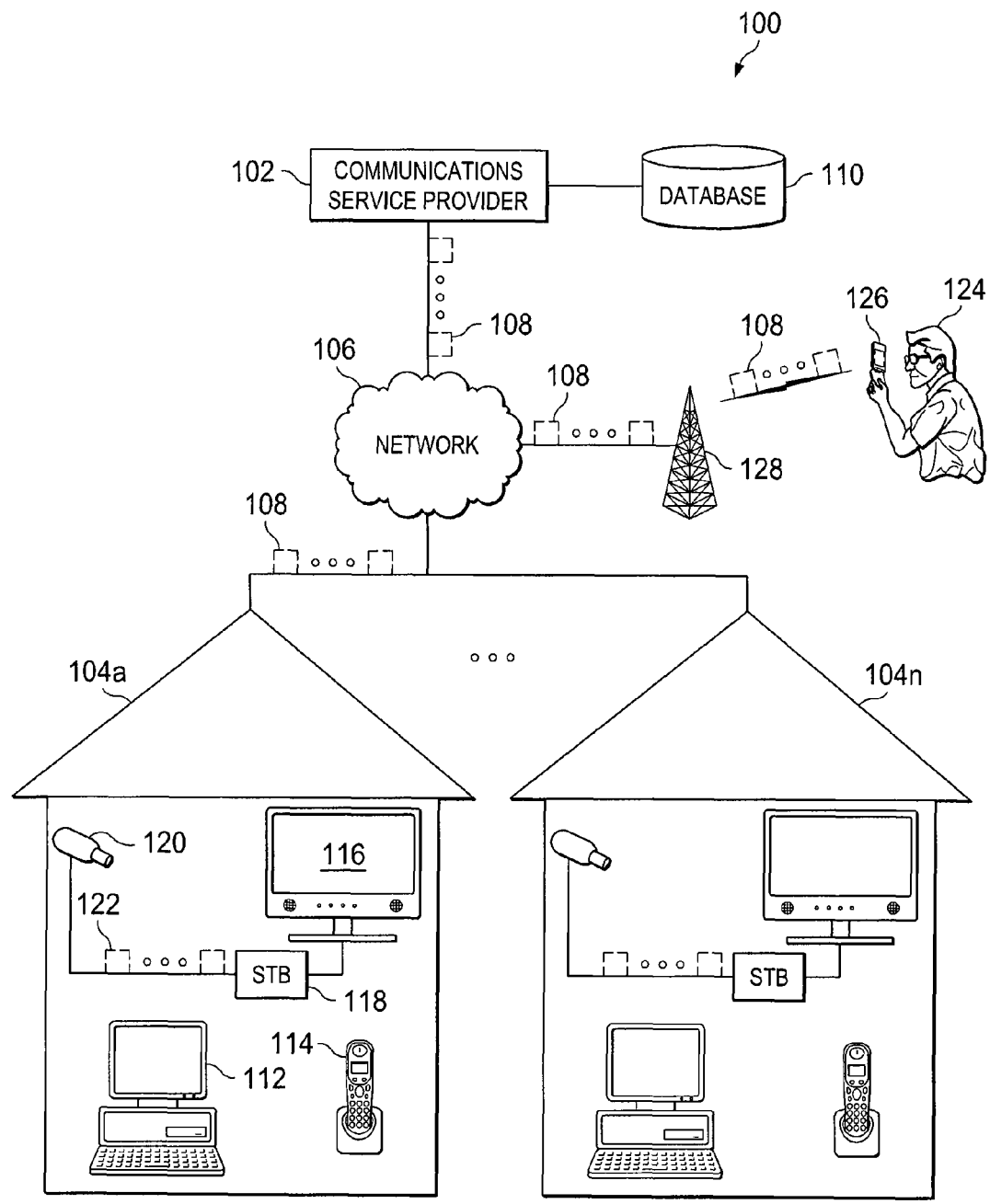
FIG. 1 is an illustration of an illustrative network environment for a communications service provider to provide communications services to residential and/or commercial customers.

With regard to FIG. 1, a network environment 100 includes a communications service provider 102 that provides a range of communications services to customers 104a-104n (collectively 104) in residential homes or businesses. The communications services provided by the communications service provider 102 are generally subscription based, and may include IPTV, high-speed data services, voice over IP (VoIP) telecommunications services, and surveillance services. The communications services may be provided over a network 106, such as the Internet. In providing the various communications services, data packets 108 may be utilized to communicate data with network addressed electronics devices owned by the customers 104.

The communications service provider 102 may utilize one or more computing systems (not shown) that communicate with one or more databases 110 that are configured to store information about the customers 104. The database(s) 110 may be used for provisioning the communications services that are being provided to each of the customers 104. In one embodiment, the database(s) 110 include digital rights management (DRM) that provides for a customer to access particular television channels, for example, by checking with the digital rights management database prior to enabling a customer to access a particular television channel. For example, a customer who pays for the Home Box Office (HBO®) television channel may access HBO® in response the DRM database being checked to verify that the customer is a subscriber of the HBO® television network.

Customer 104a owns a computer 112, telephone 114, television 116 that is connected to a set-top box (STB) 118, and surveillance equipment 120. The surveillance equipment 120 may include a surveillance video camera or any other surveillance equipment, as understood in the art. The computer 112, telephone 114, and television 116 are each configured to communicate over the network 106 using data packets 108, as provided by the communications service provider 102. In addition, the surveillance equipment 120 is shown to be in communication with the set-top box 118. In one embodiment, the surveillance equipment 120 may be wired via a USB port, for example. Alternatively, a wireless connection between the set-top box 118 and surveillance equipment 120 may be made. The set-top box 118 may also communicate surveillance signals (e.g., video or audio) with the surveillance equipment 120 using data packets 122 whether a wired or wireless connection is utilized.

A customer or subscriber 124 may utilize a telecommunications device 126, such as a mobile telephone, VoIP telephone, smart telephone, or any other telecommunications device, configured to enable the customer 124 to receive and display video. The telecommunications device 126 is wireless and configured to communicate data packets 108 via a wireless access point 128, such as a mobile telephone communications tower, to communicate via the network 106. The network 106 may be formed of one or more communications networks, including mobile communications networks, the Internet, private networks, or any other communications networks as understood in the art.

In operation, the customer 124 may utilize the telecommunications device 126 to access video being produced from the surveillance equipment 120. To facilitate communications from the surveillance equipment 120, the communications service provider 102 may configure one or more computing systems to facilitate receiving requests from the telecommunications device 126 to access the surveillance equipment 120. The communications service provider may further configure the computer system(s) to limit any communications device other than the telecommunications device 126 from accessing data being generated by the surveillance equipment 120, as further described herein.

With regard to FIG. 2A, a telecommunications service provider may operate one or more networks to enable subscribers to access and control surveillance equipment utilizing a telecommunications device. The communications service provider 202 may provide a variety of "back-office" services, including accounting services, billing services, provisioning services, and so forth, to provide television, telecommunications, data, and surveillance services. The back-office services may be managed utilizing a provisioning system 203 that may include a provisioning database (not shown) and execute software to perform provisioning and other management (e.g., billing) functionality. The communications service provider 202 may also operate a digital rights management server 204 configured to manage DRM keys for IPTV, surveillance system services, or other services, to enable subscribers to access particular video content and surveillance equipment. In addition, the communications service provider 202 may manage a middleware server 206 which may be configured to manage and provide customers with television services, data services, telecommunications services, and surveillance system services. Network access equipment 208a-208n (collectively 208) may be configured to enable subscribers of the communications service provider 202 to interact with the middleware server 206, provisioning server (not shown), and DRM server 204, for example, in performing communications using a television, computer, telephone, or surveillance equipment.

A customer of the communications service provider 202 may utilize television equipment, including a set-top box 210, to access IPTV at his or her home or office. The set-top box 210 is typically provisioned by the communications service provider 202 prior to installation at the customer's home or office. In provisioning the set-top box 210, customer and set-top box information may be stored in a database to manage the customer's account and enable the communications service provider 202 to bill the customer, establish network address(es) for the customer, and manage communications to the customer. The set-top box 210 may be utilized to enable surveillance equipment 212 to operate using service provisioning by the communications service provider 202. The surveillance equipment 212 may include video surveillance equipment, audio surveillance equipment, or any other type of surveillance equipment for the customer to monitor his or her property.

The customer of the communications service provider 202 may utilize a telecommunications device 214 to access and control the surveillance equipment 212 via the middleware server 206, as further described herein. The telecommunications device 214 may be serviced by the communications service provider 202 or a different communications service provider, such as a mobile telephone service provider. In order for the telecommunications device 214 to receive video signals from the surveillance equipment 212, the telecommunications device 214 is to have video capabilities. In other words, the telecommunications device 214 is configured to receive and play video on an electronic display for the customer to view.

To ensure security in distributing surveillance video from the surveillance equipment 212 onto the Internet 216 or other public networks, the principles of the present invention utilize digital rights management keys to restrict access to the surveillance video produced by the surveillance equipment 212. To manage and distribute the DRM keys, the DRM server 204 may manage one or more DRM keys 218 that are distributed to the set-top box 210 and telecommunications device 214, as shown by DRM keys 218a and 218b, respectively. In an alternative embodiment, the DRM key 218a may be distributed to the surveillance equipment 212 if the surveillance equipment 212 is configured to perform functionality of the set-top box 210 in terms of communicating with the middleware server 206.

Two signaling paths between the set-top box 210 and/or surveillance equipment 212 and telecommunications device 214 are shown. One signaling path is a video media path 220 and the other is a video signaling path 222. The video signaling path 222 operates to communicate control instructions to control media, including audio and video, being collected by the set-top box 210 from the surveillance equipment 212 and distribution of the surveillance media or content to the telecommunications device 214. The video media path 220 is a data path for which surveillance video or content is communicated from the surveillance equipment 212 vis-à-vis the set-top box 210 and Internet 216, among other networks, to the telecommunications device 214.

A digital rights management call flow 224 is shown as dashed lines. The DRM call flow operates to request video surveillance DRM keys 218 and communicate the video surveillance DRM keys to the set-top box 210 and telecommunications device 214. The DRM call flow 224 ultimately operates to limit any devices other than the telecommunications device 214 to access surveillance video being generated by the surveillance equipment 212 and communicated from the set-top box 210 to the Internet 216 or any other public network.

Figure 2B:
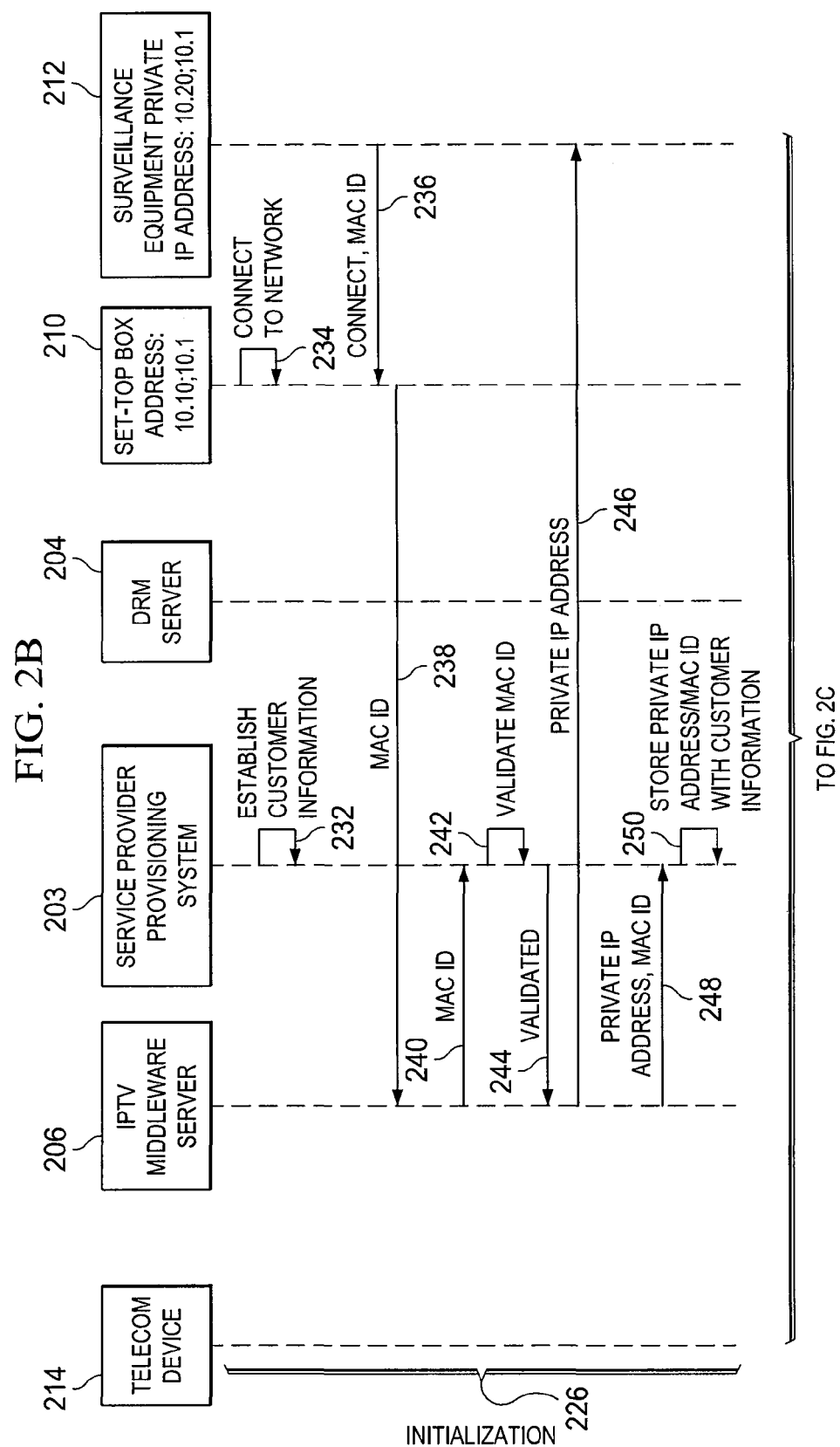
FIGS. 2B and 2C are signal diagrams of an illustrative process for enabling a customer to access surveillance signals produced by surveillance equipment from a telecommunications device.
Figure 2C:
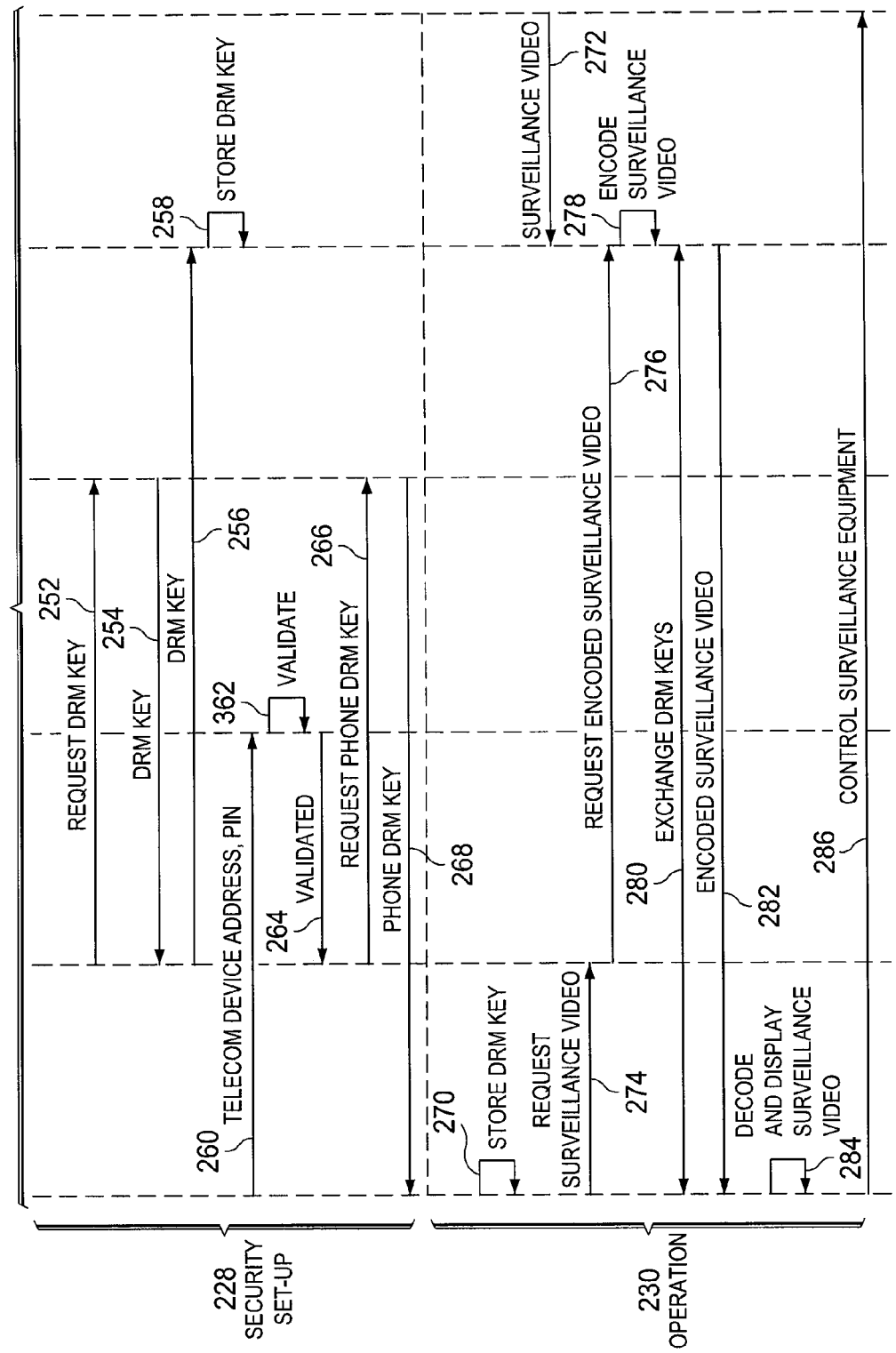

With regard to FIGS. 2B and 2C, signaling communications between the various communications devices of FIG. 2A are shown. Three phases of operation are shown, including initialization 226, security set-up 228, and operations 230. As understood in the art, prior to a set-top box being installed at a home of a customer, the communications service provider performs provisioning of the set-top box so as to store information associated with the set-top box 210, including MAC ID, equipment type, and any other information associated with the set-top box 210 to store in a provisioning database. After provisioning, the installed set-top box may readily communicate with the service provider once installed. The initialization process 226 may also include the service provider establishing customer information at the service provider provisioning system 203. The customer information may include address information of the set-top box 210 and surveillance equipment 212 that is to be installed at a residence or work environment of the customer. In establishing the customer information at step 232 by the service provider, the customer may call the service provider or enter the customer information into a website managed by the service provider provisioning system 203. The service provider may manually or automatically store the customer information in the service provider provisioning system 203, where the customer information may include name, address, telephone number, equipment type, equipment address, demographic information, or any other information associated with the customer or equipment (e.g., set-top box 210 and surveillance equipment 212) that is to be provided to the customer. At step 234, the service provider may have a field team install the set-top box 210 at a residence or work environment of the customer. In installing the set-top box 210, the field team may connect the set-top box 210 to a television and to a network, such as the Internet, either via a wired or wireless connection.

At step 236, the surveillance equipment 212 may be connected to the set-top box 210 via a wired or wireless connection and a MAC ID address may be communicated from the surveillance equipment 212 to the set-top box 210. The MAC ID address may be communicated from the set-top box 210 to the IPTV middleware server 206 at step 238. It should be understood that other information associated with the set-top box 210 and surveillance equipment 212 may be communicated to the middleware server 206 at step 238 as well. At step 240, the MAC ID address may be communicated from the middleware server 206 to the service provider provisioning system 203. The service provider provisioning system 203 validates the MAC ID at step 242, where the validation includes verifying that the MAC ID address communicated from the surveillance equipment 212 matches the MAC ID address stored by the service provider provisioning system 203 in association with customer information. In response, if the MAC ID is validated in step 242, a validation indicator is communicated from the service provider provisioning system 202 to the middleware server 206 at step 244.

The middleware server 206, in response to receiving validation that the MAC ID of the surveillance equipment 212 matches the MAC ID that was provisioned for the customer and stored by the service provider provisioning system 203, communicates a private IP address to the surveillance equipment 212 at step 246. The private IP address is an address that limits other devices with the ability to access the surveillance equipment 212. The private IP address may be the address 10.20.10.1, for example. The middleware server 206 supports dynamic host configuration protocol (DHCP) functionality because the middleware server 206 is a central signaling control point between the telecommunications device 214 and surveillance equipment 212. In one embodiment, the middleware server 206 maintains a pool of private IP addresses for use with customers who subscribe to the surveillance service. Alternatively, private IP addresses could be provided by a server distinct from the middleware server 206, especially if a large number of private IP addresses are to be managed.

In addition to communicating the private IP address to the surveillance equipment 212, the private IP address and MAC ID of the surveillance equipment 212 are communicated from the middleware server 206 to the service provider provisioning system 202 at step 248. The service provider provisioning system 202 stores the private IP address and MAC ID with the customer information. By storing the private IP address and MAC ID with the customer information, the surveillance equipment 212 is associated with the customer name, address, telephone number of the customer's home telephone, telephone number of the telecommunications device 214, and customer chosen PIN number (e.g., 4-digit code) for use in providing the customer surveillance equipment service. Once the IP address and MAC ID is stored with the customer information, the initialization process 226 is complete.

The security set-up process 228 is used to ensure security is maintained for the customer by limiting access to content or signals produced by the surveillance equipment 212 from an unauthorized device on a public network. In providing security, the middleware server 206 may communicate a request to the DRM server 204 at step 252. At step 254, the DRM server 204 communicates a DRM key to the middleware server 206. The middleware server 206 passes the DRM key to the set-top box 210 at step 256. At step 258, the set-top box 210 stores the DRM key. The DRM key enables the middleware server 206 to communicate with the set-top box 210 to activate a video encoding feature. In one embodiment, the video encoding feature uses H.264 sub-quarter common intermediate format (sub-QCIF) video formatting. The use of this particular video formatting standard accommodates video resolution for standard wireless telecommunications devices that have 128×96 lines on the electronic displays. It should be understood that other video compression and line resolution formatting may be used based on the configuration of the telecommunications device that a user is using.

At step 260, the telecommunications device 214 may be utilized by the customer to communicate with the service provider provisioning system 203 to communicate an address of the telecommunications device and PIN. In communicating the telecommunications device address and PIN, the telecommunications device 214 may be utilized to the website that is supported by the service provider provisioning system 203. At step 262, the service provider provisioning system 203 validates the address of the telecommunications device and PIN by accessing a database that stores the customer information. At step 264, a validation indicator is communicated by the service provider provisioning system 202 to the middleware server 206. At step 266, the middleware server 206 requests a wireless phone DRM key from the DRM server 204. The wireless phone DRM key is communicated from the DRM server 204 to the telecommunications device 214 at step 268. At step 270, the telecommunications device 214 stores the phone DRM key for use in accessing the surveillance services provided by the communications service provider. At this point, the security set-up process 228 is complete.

At step 272, the surveillance equipment 212 communicates surveillance signals, such as video, to the set-top box 210. Although shown after the security set-up process 228 is complete, the generation and communication of the surveillance video to the set-top box 210 from the surveillance equipment 212 at step 272 may be performed at any time on a continuous or non-continuous basis. At step 274, the customer using the telecommunications device 214 may request from the surveillance equipment 212 to be communicated to the telecommunications device 214. At step 276, the middleware server 206 that received the request for surveillance video from the telecommunications device 214 may request encoded surveillance video from the set-top box 210. At step 278, the set-top box 210 may encode the surveillance video being produced by the surveillance equipment 212. In encoding the surveillance video 278, the set-top box may use the H.264 video encoding standard or any other video encoding standard accepted and displayed on the telecommunications device 214.

At step 280, the telecommunications device 214 and set-top box may exchange DRM keys in determining whether the telecommunications device 214 has access rights to the surveillance video being generated by the surveillance equipment. Additional verification of access rights may be performed by establishing a private network communication between the telecommunications device 214 and set-top box 210, verifying address information of the telecommunications device 214, or otherwise. The exchange of the DRM keys may be a one-time event or continuous event every 15, 30 or 60 seconds, for example. By exchanging the DRM keys between a telecommunications device 214 and set-top box 210, security may be maintained between the two devices throughout communications, thereby protecting any unauthorized devices from intercepting surveillance video being communicated from the set-top box 210 to the telecommunications device 214 at step 282. At step 284, the telecommunications device 214 may decode and display the surveillance video. At step 286, the telecommunications device 214 may be used by the customer to control the surveillance equipment 212. In controlling the surveillance equipment 212, the customer may reposition the surveillance equipment, zoom using the surveillance equipment, increase sensitivity of the surveillance equipment, or perform any other function as understood in the art. The operation process 230 may continue as long as the customer desires to interact with the surveillance equipment 212 from the telecommunications device 214.

Figure 3:
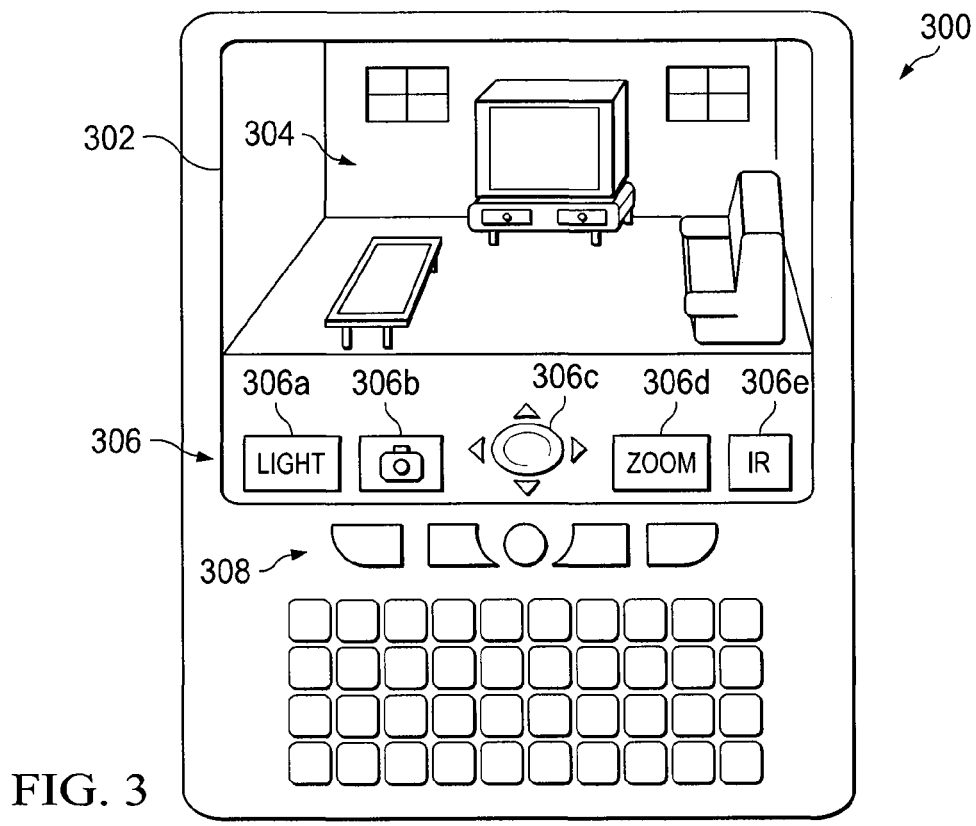
FIG. 3 is an illustration of an illustrative telecommunications device showing an image generated by surveillance equipment.

With regard to FIG. 3, a telecommunications device 300 with an electronic display 302 may display a scene 304 captured by surveillance equipment. The telecommunications device 300 may be any electronic device that may be wired or wirelessly in communication with a set-top box and/or surveillance equipment. A number of soft-buttons 306 may be provided to enable the customer to control the surveillance equipment to which the telecommunications device 300 is in communication. The soft-buttons 306 may include a light soft-button 306(a), photograph soft-button 306(b), reposition soft-buttons 306(c), zoom soft-button 306(d) and IR soft-button 306(e). The light soft-button 306(a) enables the customer to turn on a light at the surveillance equipment to light up the scene 304 that is being captured by the surveillance equipment. The photograph soft-button 306(b) may be utilized by the customer to take a still photograph of the scene 304 being displayed. The repositioning soft-button 306(c) may enable the customer to reposition a camera, for example, up, down, left, or right if the surveillance equipment has such capabilities. The zoom soft-button 306(d) may enable a video camera to be zoomed in or out. The IR soft-button 306(e) enables the customer to switch the surveillance equipment from a visual image to an infrared image if the surveillance equipment is configured with dual-spectrum video mode. The telecommunications device 300 may include DRM keys 308 that are respectively aligned with each of the soft-buttons 306 to select the respective soft-buttons. It should be understood that additional or other functionality may be provided to enable the customer to control the surveillance equipment from the telecommunications device 300.

Figure 4:
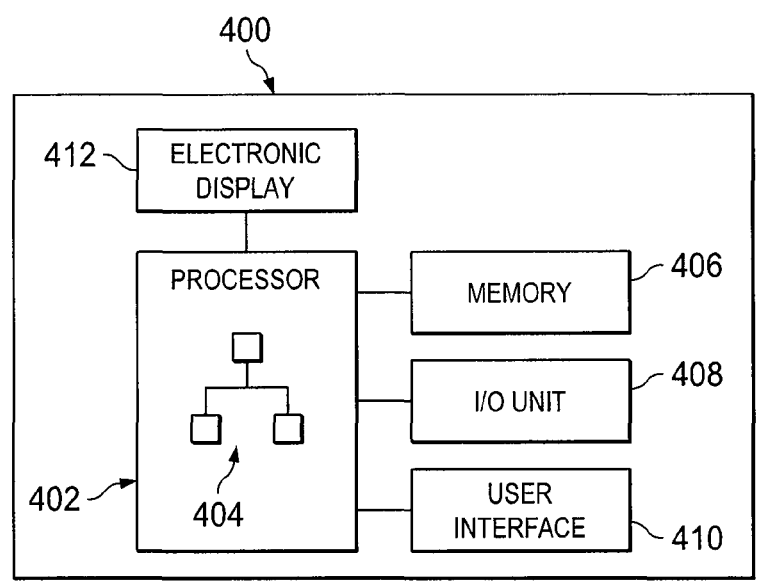
FIG. 4 is a block diagram of an illustrative telecommunications device configured to remotely access and control surveillance equipment.

With regard to FIG. 4, a telecommunications device 400 that may be utilized to perform the functions of the telecommunications described herein. The telecommunications device 400 may include a processing unit 402 that executes software 404. The processing unit 402 may be in communication with memory 406, input/output (I/O) unit 408, and user interface 410. In addition, the processing unit 402 may be in communication with an electronic display 412. The software 404 may be composed of one or more modules configured to manage one or more DRM keys, decode encoded video signals, display the video captured photographs from the video signals, and perform other functionality in accordance with the principals of the present invention. The memory 406 may be configured to store executable software, data, such as video data, and any other parameters for use in enabling the customer to access or communicate with surveillance equipment remotely and display the surveillance video received from the surveillance equipment. The I/O unit 408 may be configured to communicate with a network, such as a telecommunications network and/or the Internet. The user interface 410 may be any electromechanical element on the telecommunications device 400, such as keys, thumb wheel, etc. The electronic display 412 may be configured to display surveillance video or any other graphical image, as understood in the art. In one embodiment, the electronic display 412 is a touch screen that responds to touch interaction by a user for selecting elements (e.g., soft-buttons), altering an image (e.g., zoom), or controlling any other aspect of a video or image being displayed on the electronic display.

Figure 5:
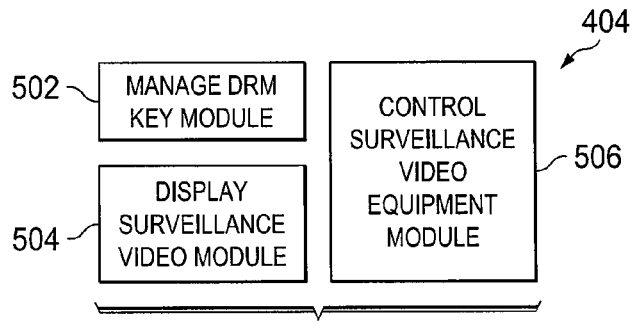
FIG. 5 is a block diagram of software modules configured to be executed in the telecommunications device of FIG. 4 and enable a user to access, view, and control surveillance equipment.

With regard to FIG. 5, software 404, which may be a complete software application, may be configured as distinct software modules. The software 404 may come pre-loaded on the telecommunications device 400 or downloaded via a network, as understood in the art. The software modules may include a manage DRM key module 502, display surveillance video module 504, and control surveillance video equipment module 506. The manage DRM key module 502 may be configured to receive and store a DRM key in addition to communicate the DRM key with a set-top box, for example. The DRM key may be a telecommunications or phone DRM key that is specifically assigned to the telecommunications device. The display surveillance video module 504 may be configured to receive, decode and display surveillance video signal using H.264 sub-QCIF video encoding or any other video encoding, as understood in the art. The control surveillance video equipment module 506 may be configured to enable a customer to remotely control surveillance equipment from the telecommunications device using soft-buttons, hard-buttons, or touch screen interaction with the telecommunications device, as understood in the art. The software 404 may have additional and/or alternative software modules that perform the same or analogous functionality, in addition to providing alternative functionality, for use in enabling a customer to remotely access, view, and control surveillance video and/or audio signals from a telecommunications device via a network.

Figure 6:
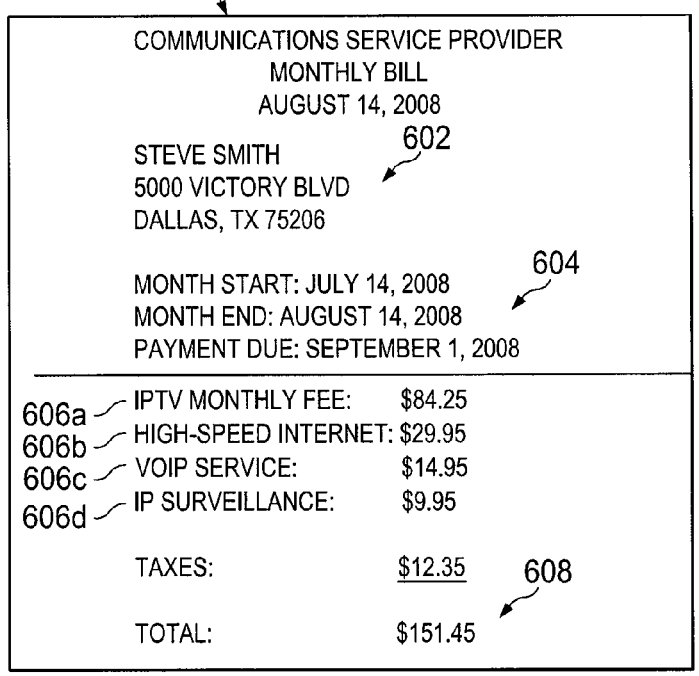
FIG. 6 is a depiction of an illustrative customer bill for communications services, including surveillance communications services, provided to a customer of a communications service provider.

With regard to FIG. 6, an illustrative monthly bill 600 for billing a customer of a communications service provider is shown. The bill 600 may include customer information 602 for use in mailing the bill 600 to the customer. It should be understood that the bill 600 may be paper or electronic, as understood in the art. Time period information 604 may be shown to indicate the time period over which the bill 600 covers for the customer receiving communications services. The communications services 606a-606d (collectively 606) may be itemized for the customer. As shown, the communications services 606 may include IPTV monthly fee 606a, high-speed Internet service 606b, voice over Internet Protocol (VoIP) 606c, and IP surveillance services 606d. Additional or fewer communications services may be listed. By including IP surveillance services 606d on the bill 600 with the other communications services 606a-606c, payment for IP surveillance services are simplified for the customer. Furthermore, because the IP surveillance services are provided as an additional service from the communications service provider, the IP surveillance services may be less expensive since the equipment is already installed for the customer.

Figure 7:
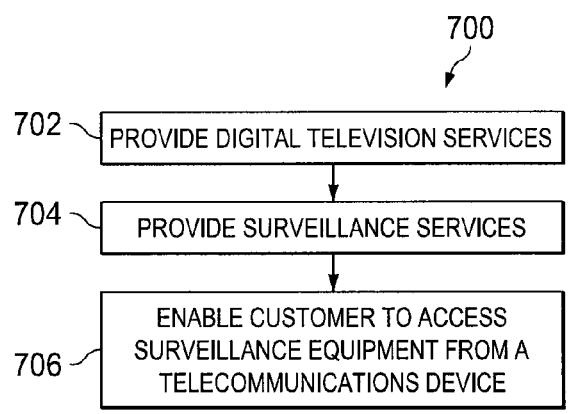
FIG. 7 is a flow diagram of an illustrative process for providing a telecommunications device remote access to surveillance signals from surveillance equipment.

With regard to FIG. 7, a flow chart of an illustrative process 700 for providing surveillance services is shown. The process 700 may include providing digital television services to a customer via middleware at step 702. In one embodiment, the middleware includes digital rights management services. At step 704, digital surveillance services may be provided to the customer via the middleware. In providing digital surveillance services to the customer, the customer may be enabled to access surveillance equipment via the middleware from a remote location using a telecommunications device at step 706. The telecommunications device may be authorized to access the surveillance equipment by the digital rights management services. In authorizing the telecommunications device to access the surveillance equipment, a digital rights management key assigned to the telecommunications device may be compared to a digital rights management key assigned to television equipment, such as a set-top box, or surveillance equipment. Additionally or alternatively, authorization of the telecommunications device may be performed by comparing a network address, telephone number, or other identifier associated with the telecommunications device with information stored in a database, such as a provisioning database managed by a communications service provider. In one embodiment, the customer may control the surveillance equipment via the telecommunications device. The customer may be billed for the digital television service and digital surveillance services on a single bill.

Figure 8:
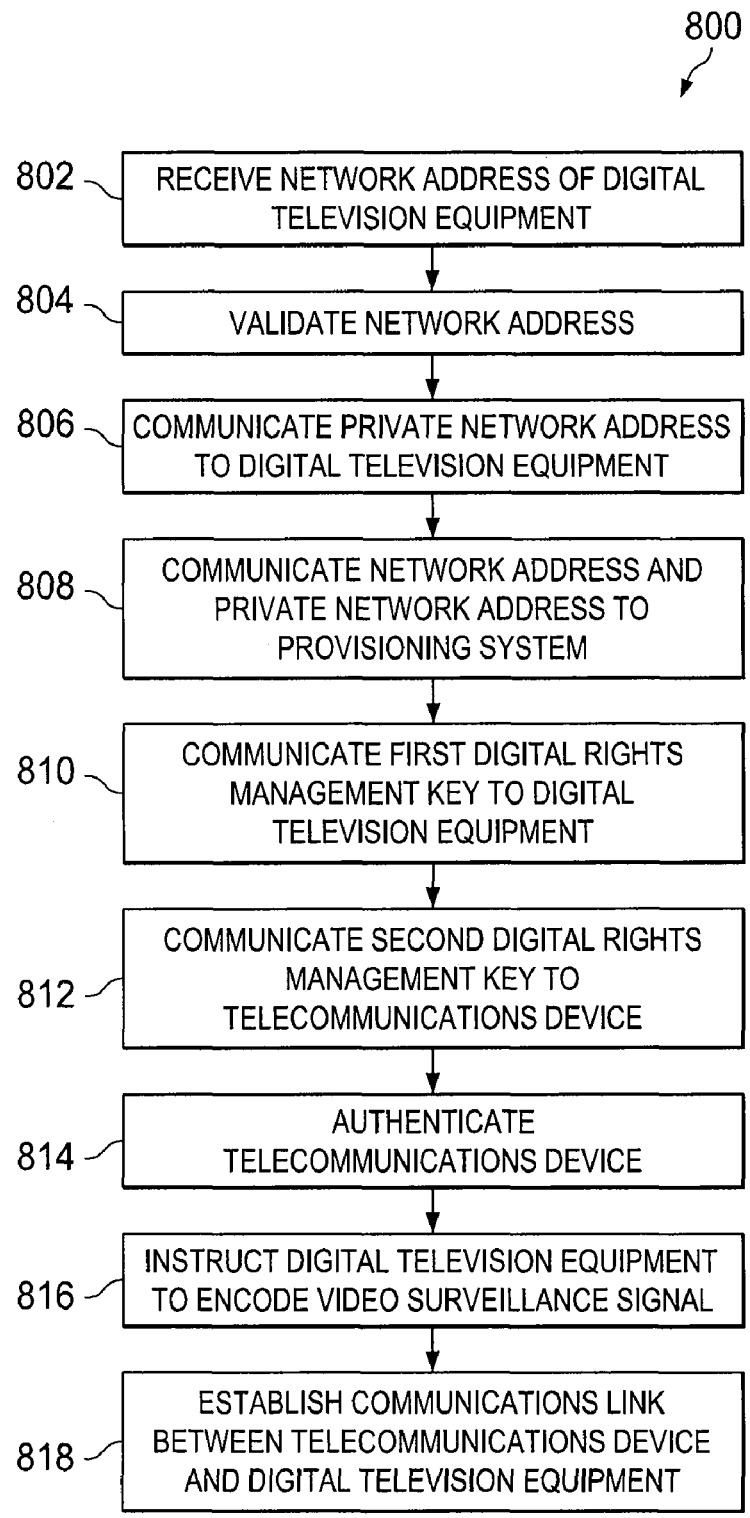
FIG. 8 is a flow diagram of another illustrative process for providing a telecommunications device remote access to surveillance signals from surveillance equipment.

With regard to FIG. 8, a flow chart of an illustrative process 800 for providing video surveillance services is shown. The process 800 may include receiving a network address of digital television equipment of a customer of a communications service provider at step 802. In receiving the network address, such as a MAC ID address, the communications service provider may use the network address provided by a manufacturer and store the network address in a provisioning database. At step 804, the network address of the digital television equipment may be validated. In validating the network address, middleware may communicate with the provisioning database to determine whether the digital television equipment has been provisioned by the communications service provider. At step 806, a private network address may be communicated to the digital television equipment. In one embodiment, the digital television equipment may communicate the private network address to digital surveillance equipment. The network address and private network address may be communicated to a provisioning system of a communications service provider to be associated with a customer record of the communications service provider at step 808, where the communications service provider provides at least one communications service to the customer other than video surveillance services.

A first digital rights management key may be communicated to the television equipment at step 810. At step 812, a second digital rights management key may be communicated with the telecommunications device. The telecommunications device may be authenticated in response to a request to access a video surveillance signal generated by the video surveillance equipment at step 814. In authenticating the telecommunications device, a verification of at least one identifier associated with the telecommunications device may be performed by a digital rights management system and/or a provisioning system managed by the communications service provider. In response to the telecommunications equipment being authenticated, the digital television equipment may be instructed to encode the video surveillance signal generated by the video surveillance equipment at step 816. In an alternative embodiment, the encoding of the video surveillance signal may be equivalently encoded by another device, such as the video surveillance equipment itself or a server located on a network. At step 818, a communications link between the telecommunications equipment and television equipment may be established to enable the customer to view the encoded video surveillance signal.

The previous detailed description is of a small number of embodiments for implementing the invention and is not intended to be limiting in scope. One of skills in this art will immediately envisage the methods and variations used to implement this invention in other areas than those described in detail. The following claims set forth a number of the embodiments of the invention disclosed with greater particularity.

What is claimed:

1. A method for providing video surveillance services, said method comprising:
    receiving a network address of digital television equipment of a customer of a communications service provider;
    validating the network address of the digital television equipment;
    communicating a private network address to the digital television equipment;
    communicating the network address and private network address to a provisioning system of a communications service provider to be associated with a customer record of the communications service provider, the communications service provider providing at least one communications service to the customer other than video surveillance services;
    communicating a first digital rights management key to the television equipment;
    communicating a second digital rights management key with the telecommunications device;
    authenticating the telecommunications device in response to a request to access a video surveillance signal generated by video surveillance equipment in communication with the digital television equipment;
    in response to the telecommunications device being authenticated, instructing the digital television equipment to encode the video surveillance signal generated by the video surveillance equipment; and
    establishing a communications link between the telecommunications device and the digital television equipment to enable the customer to view the encoded video surveillance signal.

2. The method according to claim 1, further comprising billing the customer for the digital television services and digital surveillance services on a single bill.

3. The method according to claim 1, further comprising establishing the telecommunications device of the customer as an authorized device to access the surveillance equipment of the customer.

4. The method according to claim 1, further comprising establishing a communications link between digital television equipment and the surveillance equipment of the customer, the surveillance equipment communicating surveillance signals via the digital television equipment to the telecommunications device of the customer.

5. The method according to claim 1, further comprising:
    providing high-speed data communications services to the customer; and
    providing telecommunications services to the customer, wherein each of the services are provided via the middleware.

6. The method according to claim 1, wherein said video surveillance equipment includes a video camera.

7. The method according to claim 1, further comprising determining whether said digital television equipment has access rights to particular television channels.

8. The method according to claim 1, wherein receiving the network address includes receiving a MAC address.

9. The method according to claim 1, wherein receiving the network address of the digital television equipment includes receiving the network address from a set-top box.

10. The method according to claim 1, wherein instructing the digital television equipment to encode the video surveillance signal includes instructing the digital television equipment to encode the video surveillance signal to a format compatible with the telecommunications device.

11. The method according to claim 1, further comprising:
    receiving a personal identification number (PIN) from the telecommunications device;
    authenticating the PIN;
    enabling the telecommunications device to access the encoded video surveillance signal.

12. The method according to claim 1, wherein authenticating the telecommunications device includes exchanging the first and second digital management rights management keys between the telecommunications device and the digital television equipment.

13. The method according to claim 1, further comprising enabling the customer to control the video surveillance equipment.

14. The method according to claim 13, wherein enabling the customer to control the surveillance equipment comprises enabling the customer to control the surveillance equipment via the telecommunications device.

15. The method according to claim 1, further comprising establishing secure communications between the telecommunications device and the television equipment.

* * * * *